United States Patent
Salazar Fabian et al.

(10) Patent No.: US 9,950,672 B1
(45) Date of Patent: Apr. 24, 2018

(54) ARTICULATED FENCE FOR A VEHICLE CARGO AREA

(71) Applicant: FORD GLOBAL TECHNOLOGIES, LLC, Dearborn, MI (US)

(72) Inventors: Edgar Salazar Fabian, Cuautitlan Izcalli (MX); Alexia Sarabanda Ontiveros Briones, Santa Fe (MX)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/333,988

(22) Filed: Oct. 25, 2016

(51) Int. Cl.
*B60R 5/04* (2006.01)
*B60J 5/10* (2006.01)
*B60J 5/12* (2006.01)

(52) U.S. Cl.
CPC ............... *B60R 5/04* (2013.01); *B60J 5/101* (2013.01); *B60J 5/107* (2013.01); *B60J 5/12* (2013.01)

(58) Field of Classification Search
CPC .... B60J 5/101; B60J 5/12; B60R 5/04; B60R 5/044; B60R 5/045; B60R 5/048; B62D 25/087
USPC .................................. 296/24.4, 24.43, 24.45
See application file for complete search history.

(56) References Cited

U.S. PATENT DOCUMENTS 3,423,121 A * 1/1969 Lipkin .................... B60R 21/06 160/229.1
6,349,986 B1 * 2/2002 Seel ........................ B60R 5/047 160/265
2014/0119863 A1 5/2014 Hill et al.
2015/0298638 A1 * 10/2015 Maier ..................... B60R 21/06 296/24.4

FOREIGN PATENT DOCUMENTS

| DE | 102006007340 A1 | 8/2007 |
| DE | 102006022665 A1 | 11/2007 |
| EP | 2724891 B1 | 12/2015 |
| FR | 2980421 B1 | 11/2013 |
| JP | 11278156 A | 10/1999 |
| JP | 2001301530 A | 10/2001 |

OTHER PUBLICATIONS

English Machine Translation of DE102006007340A1.
English Machine Translation of DE102006022665A1.

(Continued)

*Primary Examiner* — Jason S Daniels
(74) *Attorney, Agent, or Firm* — Vichit Chea; King & Schickli, LLC

(57) ABSTRACT

A vehicle having a cargo area accessible through a liftgate opening frame and partially defined by a floor, side quarter trims, and pillar covers is provided. The vehicle includes an articulated fence movable between a stowed position and an elevated position, and a guide formed in at least one of the pillar covers for guiding the articulated fence between the stowed position and the elevated position. A motor is positioned behind one of the side quarter trims for moving a belt attached to the articulated fence. The articulated fence is transparent and positioned within a recess beneath the floor in the stowed position. A cover may be attached to the articulated fence and is substantially flush with the floor when the articulated fence is in the stowed position.

20 Claims, 3 Drawing Sheets

(56) References Cited

OTHER PUBLICATIONS

English Machine Translation of EP2724891B1.
English Machine Translation of FR2980421B1.
English Machine Translation of JP2001301530A.
English Machine Translation of JPH11278156A.
Cargo Management-Exterior, "http://www.cadillac.com/crossovers-suvs/srx-crossover/accessories.html.".

* cited by examiner

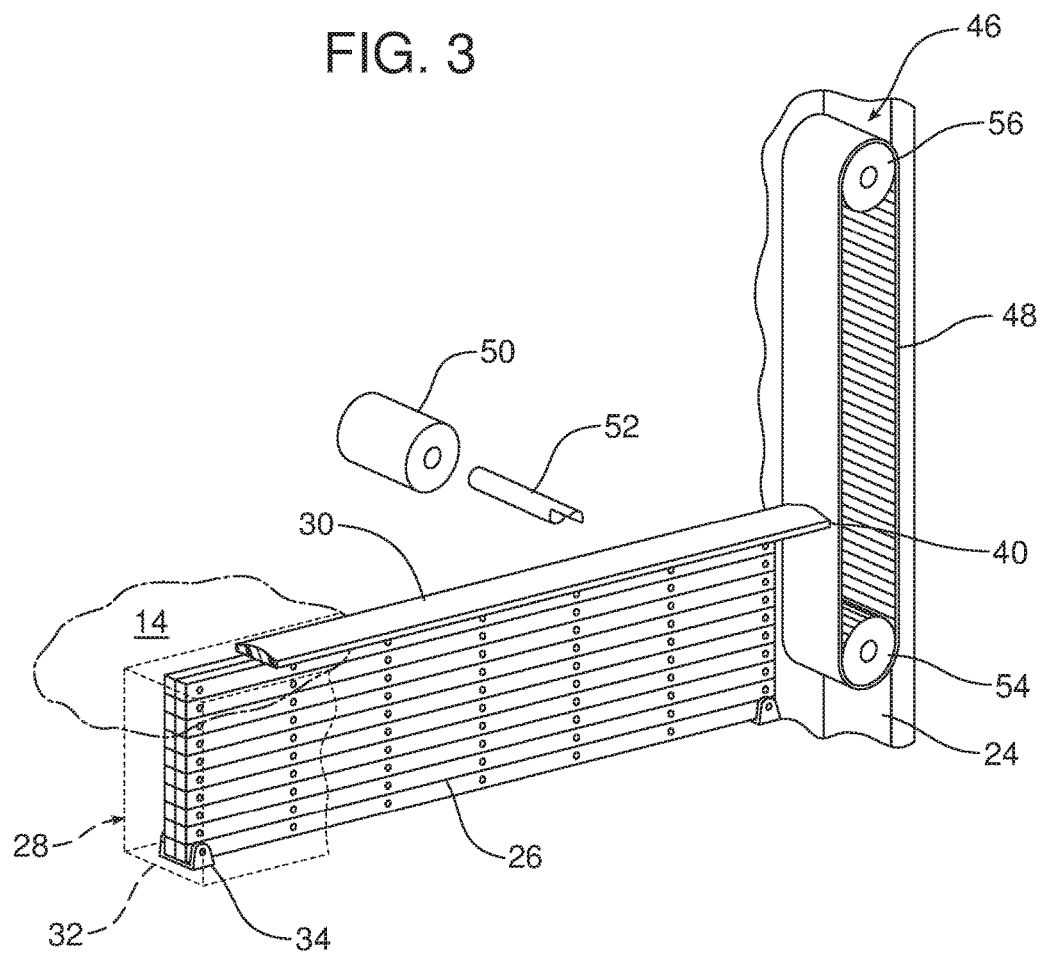

ARTICULATED FENCE FOR A VEHICLE CARGO AREA

TECHNICAL FIELD

This document relates generally to retractable fences for vehicle cargo areas, and more specifically to a retractable articulated fence.

BACKGROUND

Vehicles such as hatchbacks, vans, sports utility vehicles (SUVs) and station wagons may include a rear door or liftgate. The liftgate, for example, provides access to the rear of the interior of the vehicle through a liftgate opening frame. These liftgates typically open upwards or sideways to expose a storage compartment or cargo area of the vehicle.

It is well known that vehicle cargo areas, especially those that are partially defined by a liftgate or deck lid of a vehicle, have a problem with retaining cargo (e.g., groceries, boxes, and/or packets/suitcases) inside the cargo area when the liftgate or deck lid is opened. Acceleration of the vehicle can overturn cargo and/or shift cargo to a rear extreme of the cargo area such that the cargo falls out of the cargo area as soon as the liftgate or deck lid is opened. This problem is exacerbated when the vehicle is parked on an inclined driveway or roadway. Fragile cargo, such as eggs or glass jars, can break upon falling and contacting the ground and cargo can be lost or damaged as a result. Vehicle owners are expectedly frustrated and upset when such events occur.

After-market cargo nets or grocery retaining meshes, and bins are available to combat these types of problems. The after-market cargo nets, however, have their own drawbacks. For instance, after-market cargo nets require a time consuming manual installation process to be performed by the vehicle owner. A typical installation requires positioning four loops extending from the corners of the cargo net over buttons or hooks positioned within the cargo area. Once installed, the cargo net remains a barrier to loading cargo into the cargo area until removed or partially removed. This barrier defeats one positive aspect of a flush cargo area, i.e., ease of placement of goods into the rear cargo area.

In order to retain this positive aspect, the after-market cargo net must be installed, removed after delivery of the cargo, stowed, and reinstalled after the placement of additional cargo in the rear cargo area. This installation, removal, stowing, and reinstallation process often becomes burdensome and/or an inconvenient for the vehicle owner rather than a useful tool. Even more, the after-market cargo nets are often misplaced or lost, stowed loose in the rear cargo area where they can be in the way of unfettered use of the rear cargo area, or damaged when stowed loose and other cargo is loaded into the rear cargo area.

While retractable fences, other than nets, positioned along a rear opening of vehicle cargo areas are also known, such fences are solid panels or foldable solid panels that are manually lifted into position and generally stowed on a floor of the cargo area or apart from the vehicle until needed. In addition, each of these fences includes components (e.g., a storage compartment for the fence itself or guides for the fence) that occupy space within the cargo area. Any such components limit the amount of usable storage area and can create an obstruction to the unfettered loading and/or unloading of cargo.

Accordingly, a need exists for a rear cargo area solution that is quickly and easily moved from an out of sight, stowed position to an installed position to prevent cargo from shifting within the cargo area during driving and/or falling out of the cargo area as soon as the liftgate or deck lid is opened. Such a solution would further be quickly and easily returned to the stowed position without the need for being uninstalled. Even more, the solution should not create an obstruction to loading cargo and/or simply be in the way or occupy space within the cargo area when not in use and should not detract from the aesthetic appearance of the cargo area. In addition, moving the fence may be motorized allowing the fence to be elevated to any height depending on the size or amount of cargo being stored.

SUMMARY OF THE INVENTION

In accordance with the purposes and benefits described herein, a vehicle having a cargo area accessible through a liftgate opening frame and partially defined by a floor, side quarter trims, and pillar covers is provided. The vehicle may be broadly described as including an articulated fence movable between a stowed position and an elevated position, and a guide formed in at least one of the pillar covers for guiding the articulated fence between the stowed position and the elevated position.

In one possible embodiment, the vehicle further includes a motor positioned behind one of the side quarter trims for moving a belt attached to the articulated fence. In another possible embodiment, the articulated fence is transparent.

In yet another possible embodiment, the articulated fence is positioned within a recess beneath the floor in the stowed position.

In still another possible embodiment, the vehicle further includes a cover attached to the articulated fence. In this embodiment, the cover is substantially flush with the floor when the articulated fence is in the stowed position.

In yet still another possible embodiment, the guide is a slot molded in at least one of the pillar covers. In another, the cover extends through the slot and attaches to a belt for moving the articulated fence.

In one other possible embodiment, the guide is an aperture formed in each of the pillar covers and a cover attached to an upper end of the articulated fence extends through the guide in each of the pillar covers. In yet another, the aperture formed in each of the pillar covers is a slot.

In accordance with another possible embodiment, a vehicle having a cargo area accessible through a liftgate opening frame and partially defined by a floor, side quarter trims, and pillar covers includes an articulated fence movable between a stowed position within a recess beneath the floor and an elevated position, the articulated fence attached to the recess, and a lifter supported by a pillar adjacent the liftgate opening frame, the lifter connected to the articulated fence for moving the articulated fence between the stowed position and the elevated position.

In one other possible embodiment, the lifter includes a motor having a rotating shaft for turning a gear in contact with a belt, the gear moving the belt around a pulley. In still another, the motor is reversible and supported behind one of the quarter trims. In yet another, the lifter is positioned behind one of the pillar covers.

In still another possible embodiment, the vehicle further includes a cover attached to the articulated fence, wherein the cover extends through a guide formed in at least one of the pillar covers and is attached to the lifter. In yet another, the cover is substantially flush with the floor when the articulated fence is in the stowed position.

In accordance with one other possible embodiment, a vehicle includes a cargo area partially defined by a floor having a recess therein adjacent a liftgate opening frame and passenger and driver side quarter trims. A passenger side pillar cover further defines the cargo area and includes a guide formed therein. A driver side pillar cover further defines the cargo area and similarly includes a guide formed therein. An articulated fence movable between a stowed position within the recess beneath the floor and an elevated position has a lower end attached to a wall of the recess and an upper end. A cover is attached to the upper end of the articulated fence and opposing ends of the cover extend through the passenger side pillar cover guide and the driver side pillar cover guide. A lifter is supported by one of the passenger side and side driver side pillars and is attached to one of the opposing ends of the cover for moving the articulated fence between the stowed position and the elevated position.

In another possible embodiment, the lifter includes a belt positioned around a pulley and a gear. A motor for turns the gear and moving the belt around the pulley.

In still another possible embodiment, one of the opposing ends of the cover is attached to the belt, and the motor is reversible moving the belt and the articulated fence between the stowed position and the elevated position.

In another possible embodiment, each of the guides formed in the passenger side and side driver side pillars is a molded slot through which the cover extends.

In the following description, there are shown and described several embodiments of a vehicle cargo area and a vehicle incorporating same. As it should be realized, the systems are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle having an articulated fence for a cargo area and together with the description serve to explain certain principles thereof. In the drawing figures:

FIG. 3 is a partial perspective view of the articulated fence in a stowed position and a lifter supported by a pillar for moving the articulated fence between the stowed and elevated positions.

Reference will now be made in detail to the present preferred embodiments of the vehicle having an articulated fence for a cargo area, examples of which are illustrated in the accompanying drawing figures, wherein like numerals are used to represent like elements.

DETAILED DESCRIPTION

Figure 1:
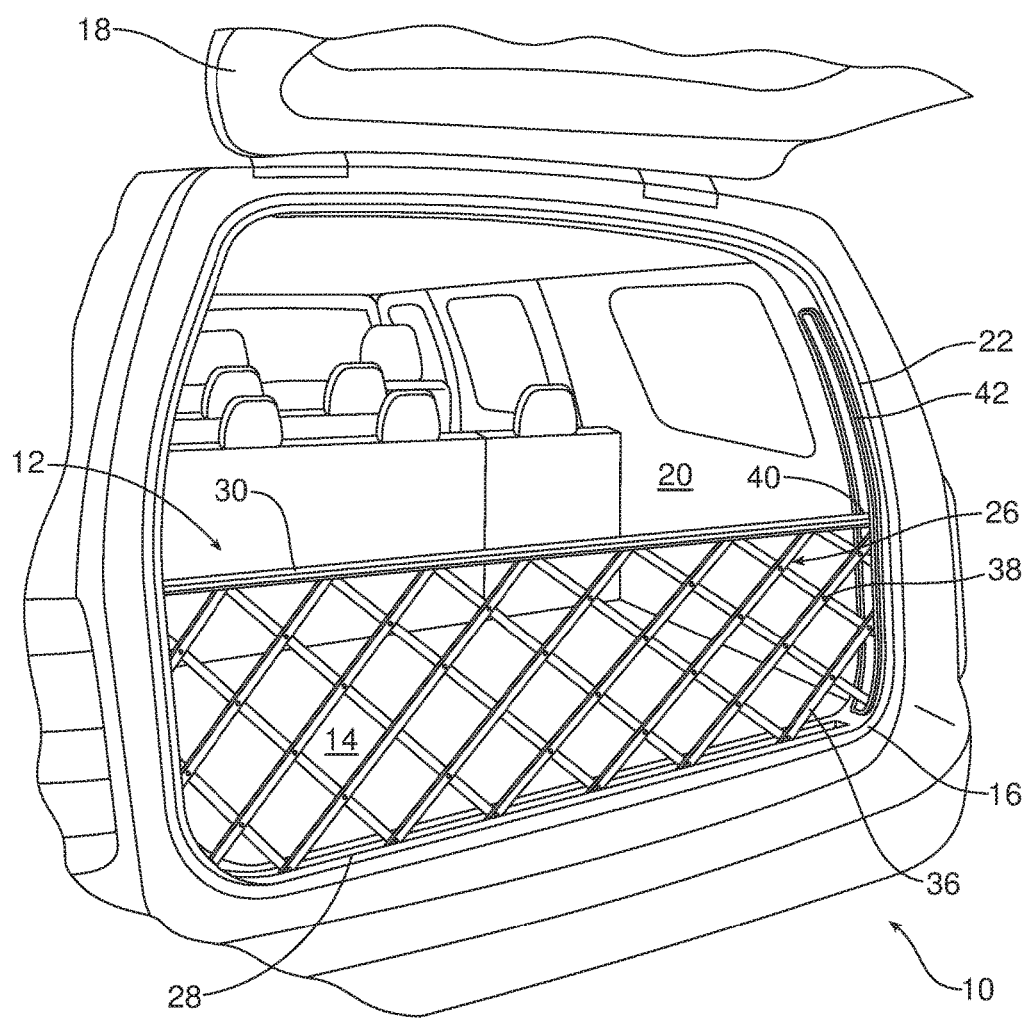
FIG. 1 is a partial perspective view of a typical vehicle having a rear cargo area showing a rear seat row and an articulated fence in a partially elevated position.

Reference is now made to FIG. 1 which illustrates a typical vehicle 10 having a rear cargo area 12. In the described embodiment, a floor 14 of the rear cargo area 12 is substantially flush with a rear liftgate opening frame 16 for a rear liftgate 18. The floor 14 can be covered with carpet or the like as is known in the art. The rear cargo area 12 is further defined by side quarter trims 20 and pillar covers 22 which cover rear pillars or D-pillars 24 (visible in FIG. 3) of the vehicle 10 in the described embodiment.

Figure 2:
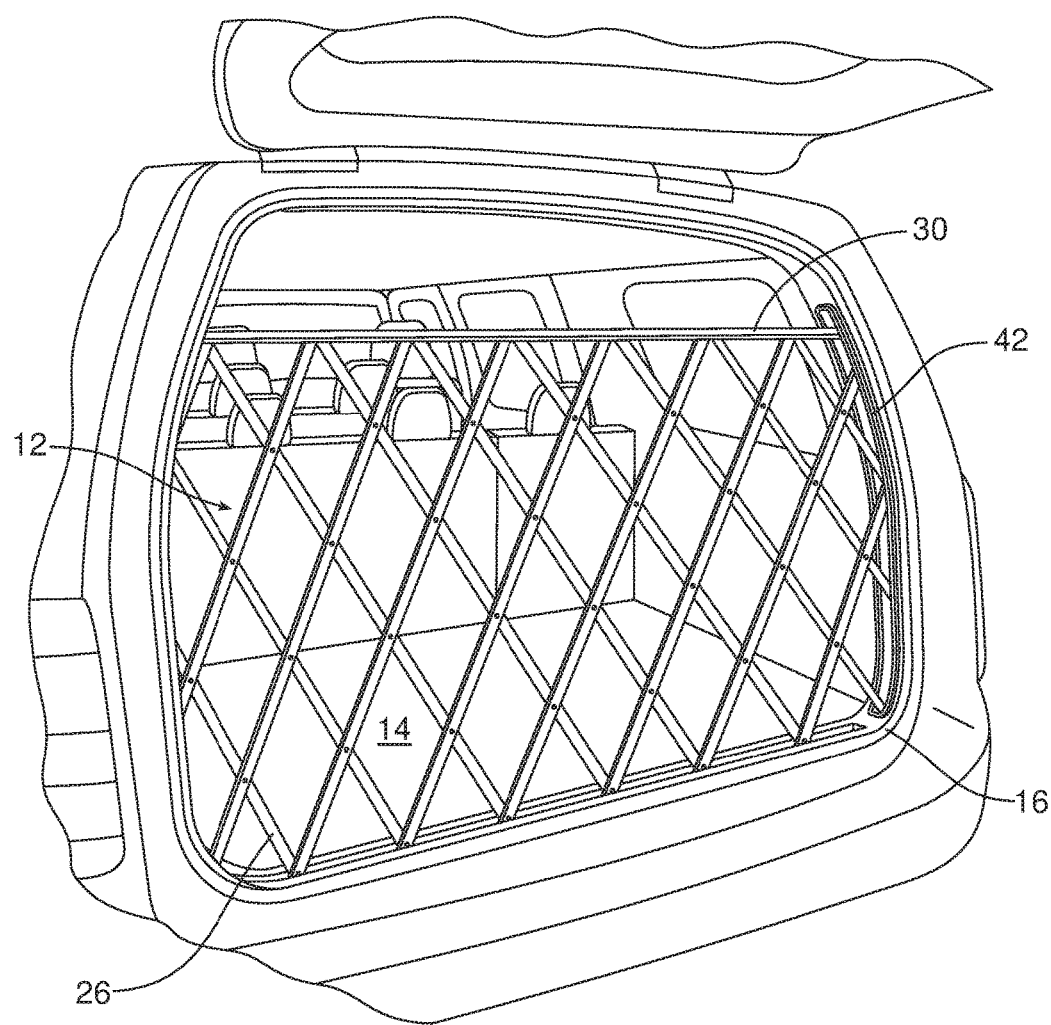
FIG. 2 is a partial perspective view of a typical vehicle having a rear cargo area showing a rear seat row and an articulated fence in an elevated position.

An articulated fence 26 is shown in a partially elevated position essentially adjacent the rear liftgate opening frame 16 in FIG. 1 and an elevated position in FIG. 2. The articulated fence 26 is further shown in a stowed position in FIG. 3. In the stowed position, the articulated fence 26 is secured in a recess 28 in the floor 14 of the cargo area 12. The articulated fence 26 is attached along a lower end to a wall 32 of the recess 28 using a bracket 34 or other attachment mechanism. The wall 32 is a floor of the recess 28 in the described embodiment but the lower end of the articulated fence 26 may be attached to side or end walls of the recess 28 in an alternate embodiment.

As further shown in FIG. 3, a cover 30 is attached to an upper end of the articulated fence 26 and obscures the articulated fence from view in the stowed position wherein. The cover 30 is substantially flush with the carpet of the floor 14 and extends along a width of the rear liftgate opening frame 16. The cover 30 may be color matched to the carpet and/or the floor 14.

As with the cover 30, the articulated fence 26 extends along a width of the vehicle 10. As best shown in FIG. 2, the articulated fence 26 in the described embodiment is a lattice structure including a plurality of strips 36 crossed and fastened together with fasteners 38 forming diamond or square shapes which make the articulated fence transparent. In other words, cargo in the rear cargo area 12 can be distinctly seen through the articulated fence 26. The strips 36 are a molded plastic in the described embodiment but could be made of other plastics, composites, wood, metal materials (e.g., aluminum, steel, etc.) and/or other similar materials in other embodiments.

Returning to FIG. 1, opposing ends 40 of the cover 30 extend through the side pillar covers 22. More specifically, the opposing ends 40 extend through guides 42 formed in the side pillar covers 22 for guiding the articulated fence 26 during its transition from a stowed position to an elevated position or back, or an initial elevated position to a subsequent elevated position. In the described embodiment, the guides 42 are apertures molded in the side pillar covers 22. In other words, the opposing ends 40 of the cover 30 extend through the apertures, which are slot-shaped in the described embodiment, of both a passenger side pillar cover and a driver side pillar cover. In alternate embodiments, the apertures can be different shapes and only one end of the cover may extend through a pillar cover.

In addition, slats 43 are attached to the articulated fence 26 or lifters 46, or components thereof, such that the slats move between positions to cover the apertures in the side pillar covers 22 generally above the cover 30. In the stowed positions, the slats 43 cover the entirety of the apertures. As the articulated fence 26 is raised, however, the amount of the slats 43 covering the apertures in the side pillar covers 22 decreases.

As shown in FIG. 3, a lifter 46 is supported by a passenger side pillar 48 behind a side pillar cover 22 and adjacent the liftgate opening frame 16 in the described embodiment. The lifter 46 may be supported by a driver side pillar or a lifter in each pillar may be utilized in an alternate embodiment. The lifter 46 is connected to the articulated fence 26 via the cover 30. More specifically, an opposing end 40 of the cover 30 extends through the guide 42 and is connected to a belt 48 of the lifter 46.

In the described embodiment, the lifter 46 includes a motor 50 supported behind one of the side quarter trims 20. The motor 50 includes a rotating shaft 52 for turning a gear 54 that is in contact with the belt 48. The gear 54 moves the belt 46 around a pulley 56 which movement serves to move the articulated fence 26 between positions. In order to raise and lower the articulated fence 26, the motor 50 is reversible.

In summary, numerous benefits result from the utilization of an articulated fence 26 within the rear cargo area 12 of a vehicle 10 as illustrated in this document. The articulated fence 26 is quickly and easily moved from an out of sight stowed position to an elevated position to prevent cargo from falling out of the cargo area 12 as soon as the liftgate 18 or deck lid is opened. Even more, the articulated fence 26 is quickly and easily returned to the stowed position to avoid creating an obstruction to loading cargo and/or simply be in the way when not in use. Last, the articulated fence 26 is stowed beneath a cover and out of sight in a manner that does not detract from the aesthetic appearance of the cargo area.

The foregoing has been presented for purposes of illustration and description. It is not intended to be exhaustive or to limit the embodiments to the precise form disclosed. Obvious modifications and variations are possible in light of the above teachings. For instance, the lifter could take different forms so long as the attached cover and articulated fence are able to be moved between positions. In addition, the lifter may be positioned behind the side quarter panel, the pillar cover or a combination of both as in the described embodiment. All such modifications and variations are within the scope of the appended claims when interpreted in accordance with the breadth to which they are fairly, legally and equitably entitled.

What is claimed:

1. A vehicle having a cargo area accessible through a liftgate opening frame and partially defined by a floor, side quarter trims, and pillar covers, comprising:
   a lattice structure movable between a stowed position and an elevated position; and
   a guide formed in at least one of said pillar covers for guiding said lattice structure between the stowed position and the elevated position.

2. The vehicle of claim 1, further comprising a motor positioned behind one of said side quarter trims for moving a belt attached to said lattice structure.

3. The vehicle of claim 1, wherein said lattice structure is transparent.

4. The vehicle of claim 1, wherein said lattice structure is positioned within a recess beneath said floor in the stowed position.

5. The vehicle of claim 4, further comprising a cover attached to said lattice structure said cover being substantially flush with said floor when said lattice structure is in the stowed position.

6. The vehicle of claim 5, wherein said guide is a slot molded in at least one of said pillar covers.

7. The vehicle of claim 6, wherein said cover extends through said slot and attaches to a belt for moving said lattice structure.

8. The vehicle of claim 1, wherein said guide is an aperture formed in each of said pillar covers and a cover attached to an upper end of said lattice structure extends through said guide in each of said pillar covers.

9. The vehicle of claim 8, wherein said aperture formed in each of said pillar covers is a slot.

10. A vehicle having a cargo area accessible through a liftgate opening frame and partially defined by a floor, side quarter trims, and pillar covers, comprising:
    a lattice structure movable between a stowed position within a recess beneath said floor and an elevated position, said lattice structure attached to said recess; and
    a lifter supported by a pillar adjacent said liftgate opening frame, said lifter connected to said lattice structure for moving said lattice structure between the stowed position and the elevated position.

11. The vehicle of claim 10, wherein said lifter includes a motor having a rotating shaft for turning a gear in contact with a belt, said gear moving said belt around a pulley.

12. The vehicle of claim 11, wherein said motor is reversible and supported behind one of said side quarter trims.

13. The vehicle of claim 11, wherein said lifter is positioned behind one of said pillar covers.

14. The vehicle of claim 10, further comprising a cover attached to said lattice structure wherein said cover extends through a guide formed in at least one of said pillar covers and is attached to said lifter.

15. The vehicle of claim 14, wherein said cover is substantially flush with said floor when said lattice structure is in the stowed position.

16. A vehicle, comprising:
    a cargo area partially defined by a floor having a recess therein adjacent a liftgate opening frame and passenger and driver side quarter trims;
    a passenger side pillar cover further defining said cargo area includes a first guide formed therein;
    a driver side pillar cover further defining said cargo area includes a second guide formed therein;
    a lattice structure movable between a stowed position within said recess beneath said floor and an elevated position, said articulated fence having a lower end attached to a wall of said recess and an upper end;
    a cover attached to said upper end of said articulated fence, wherein opposing ends of said cover extend through said first guide and said second guide; and
    a lifter supported by one of said passenger side pillar and side driver side pillar, said lifter attached to one of said opposing ends of said cover for moving said lattice structure between the stowed position and the elevated position.

17. The vehicle of claim 16, wherein said lifter includes a belt positioned around a pulley and a gear, and a motor for turning said gear and moving said belt.

18. The vehicle of claim 17, wherein said one of said opposing ends of said cover is attached to said belt and said motor is reversible moving said belt and said lattice structure between the stowed position and the elevated position.

19. The vehicle of claim 16, wherein each of said first guide and said second guide formed in said passenger side pillar and side driver side pillar is a molded slot through which said cover extends.

20. The vehicle of claim 16, wherein said lattice structure is transparent.

* * * * *

UNITED STATES PATENT AND TRADEMARK OFFICE
CERTIFICATE OF CORRECTION

PATENT NO. : 9,950,672 B1
APPLICATION NO. : 15/333988
DATED : April 24, 2018
INVENTOR(S) : Edgar Salazar Fabian and Alexia Sarabanda Ontiveros Briones It is certified that error appears in the above-identified patent and that said Letters Patent is hereby corrected as shown below:

In the Claims

Column 6, Line 39, please replace "articulated fence" with ---lattice structure---, and Column 6, Line 41, please replace "articulated" with ---lattice---, and Column 6, Line 42, please replace "fence" with ---structure---.

Signed and Sealed this
Third Day of July, 2018

Andrei Iancu
*Director of the United States Patent and Trademark Office*